United States Patent
Samuthirapandian et al.

(10) Patent No.: US 9,640,082 B2
(45) Date of Patent: May 2, 2017

(54) ELECTRIC TAXI MOTIVE CONTROL SYSTEM AND METHOD OF AN AIRCRAFT

(71) Applicant: HONEYWELL INTERNATIONAL INC., Morristown, NJ (US)

(72) Inventors: Subash Samuthirapandian, Tisaiyanvilai (IN); Markus A. Johnson, Blue River, OR (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 556 days.

(21) Appl. No.: 14/502,957

(22) Filed: Sep. 30, 2014

(65) Prior Publication Data

US 2016/0117935 A1    Apr. 28, 2016

(51) Int. Cl.
| | |
|---|---|
| *G08G 5/04* | (2006.01) |
| *B64C 25/40* | (2006.01) |
| *G08G 5/06* | (2006.01) |
| *B64C 25/34* | (2006.01) |
| *B64D 45/00* | (2006.01) |

(52) U.S. Cl.
CPC ........ *G08G 5/04* (2013.01); *B64C 25/34* (2013.01); *B64C 25/405* (2013.01); *B64D 45/00* (2013.01); *G08G 5/045* (2013.01); *G08G 5/065* (2013.01)

(58) Field of Classification Search
CPC ........ G08G 5/04; G08G 5/065; B64C 25/405; B64C 25/34
USPC ............................................................. 701/3
See application file for complete search history.

(56) References Cited

U.S. PATENT DOCUMENTS

| | | | | |
|---|---|---|---|---|
| 2008/0306691 | A1* | 12/2008 | Louis | G08G 5/06 701/301 |
| 2009/0115637 | A1* | 5/2009 | Naimer | G01C 23/00 340/979 |
| 2010/0324807 | A1* | 12/2010 | Doose | G01C 21/26 701/120 |
| 2013/0030606 | A1 | 1/2013 | Mudalige et al. | |
| 2013/0057414 | A1 | 3/2013 | Nutaro et al. | |
| 2013/0200209 | A1 | 8/2013 | Goldman et al. | |
| 2014/0278037 | A1 | 9/2014 | Choksi et al. | |

FOREIGN PATENT DOCUMENTS

| | | |
|---|---|---|
| JP | 2001006095 A | 1/2001 |
| WO | 03/107299 A2 | 12/2003 |

OTHER PUBLICATIONS

EP search report dated Jan. 25, 2016 in application No. 15 187 007.8.

\* cited by examiner

*Primary Examiner* — Richard Camby
(74) *Attorney, Agent, or Firm* — Shimokaji IP (57) ABSTRACT

An electric taxi motive control system of a first aircraft comprises a first aircraft position determining system configured to generate a first aircraft position signal, a first aircraft receiver, configured to receive transmissions of a second aircraft position signal, a first aircraft pilot interface configured to accept an input indicative of a first aircraft desired speed, and a first aircraft electronic controller configured to; determine a aircraft separation distance indicative of the distance between the first aircraft and the second aircraft, compare the aircraft separation distance with a safe distance value; and generate a modified first aircraft commanded speed signal when the aircraft separation distance is less than the safe distance value.

15 Claims, 6 Drawing Sheets

ELECTRIC TAXI MOTIVE CONTROL SYSTEM AND METHOD OF AN AIRCRAFT

BACKGROUND OF THE INVENTION

The present invention generally relates to motive control systems for aircraft with electric drive taxi systems.

When an aircraft is taxiing under impaired visibility conditions, and following another aircraft, it can be difficult for the aircraft pilot to respond and quickly increase or decrease taxi speed, to maintain a safe separation between the two aircraft. The impaired visibility conditions may be due to weather conditions, or the loss of daylight. Other conditions causing distraction, such as a heavy workload, may also make it difficult for the pilot to respond quickly and increase or decrease taxi speed to maintain safe separation. Changes in the speed of the preceding aircraft may be difficult to perceive when certain weather conditions are present or at night. A high workload or other distraction may also make changes in the preceding aircraft's speed difficult to perceive. Maintaining safe separation manually between an aircraft and the aircraft it is following, under poor visibility or other distracting conditions may contribute to an increased pilot workload and may reduce safety by compromising separation distance.

As can be seen, there may be an ongoing need to maintain safe distances between aircraft while reducing the workload of pilots, especially under low visibility or other distracting conditions.

SUMMARY OF THE INVENTION

In one aspect of the present invention, an electric taxi motive control system of a first aircraft comprises at least one electric motor selectively providing motive power to the first aircraft during taxiing in response to a first aircraft commanded speed signal or a modified first aircraft commanded speed signal; a first aircraft position determining system configured to generate a first aircraft position signal indicative of a position of the first aircraft at an airport; a first aircraft receiver, configured to receive transmission of a second aircraft position signal indicative of a position of a second aircraft at the airport; a first aircraft pilot interface configured to accept an input indicative of a first aircraft desired speed and generate the first aircraft commanded speed signal indicative of the first aircraft desired speed; a first aircraft electronic controller configured to; determine a aircraft separation distance indicative of the distance between the first aircraft and the second aircraft, at least in part based on the first aircraft position signal and the second aircraft position signal; compare the aircraft separation distance with a safe distance value; and generate the modified first aircraft commanded speed signal when the aircraft separation distance is less than the safe distance value, the modified first aircraft commanded speed signal less than the first aircraft commanded speed signal.

In another aspect of the present invention, an electric taxi motive control method of a first aircraft comprises generating a first aircraft position signal with a GPS system on the first aircraft, the first aircraft position signal indicative of the position of the first aircraft at an airport; receiving a second aircraft position signal indicative of a position of a second aircraft at the airport with a receiver on the first aircraft; receiving a first aircraft desired speed with a first aircraft pilot interface; generating a first aircraft commanded speed signal based at least in part on the first aircraft desired; determining, with a first aircraft electronic controller, an aircraft separation distance indicative of the distance between the first aircraft and the second aircraft based at least in part on the first aircraft position signal and the second aircraft position signal; comparing, with the first aircraft electronic controller, the aircraft separation distance with a safe distance value; and generating, with the first aircraft electronic controller, a modified first aircraft commanded speed signal, when the aircraft separation distance is less than the safe distance value, the modified first aircraft commanded speed signal less than the first aircraft commanded speed signal.

In yet another aspect of the present invention, an electric taxi motive control system of a first aircraft comprises at least one electric motor selectively providing motive power to the first aircraft during taxis in response to motor control commands; a steering system configured to steer the first aircraft in response to steering commands; a first aircraft position determining system configured to generate a first aircraft position signal indicative of a position of the first aircraft at an airport; a first aircraft receiver, configured to receive periodic continuous transmission of second aircraft position signals indicative of positions of a second aircraft at the airport; and receive a follow second aircraft route signal from an air traffic control center at the airport, indicative of an air traffic control instruction to the first aircraft to follow a second aircraft route; and a controller configured to, in response to receiving the follow second aircraft route signal; calculate the second aircraft route based at least in part on the second aircraft position signals; and operate the first aircraft in an automatic mode including generating motor control commands and steering commands to guide the first aircraft along the second aircraft route, at least in part based on the first aircraft position signal.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally provides an automatic control system and method to maintain a safe distance between two aircraft; and/or to guide an aircraft along another aircraft's route. When a first aircraft is following a second aircraft while taxiing, it may be difficult and/or stressful for a pilot of the first aircraft to maintain a safe distance between the two aircrafts. This is especially true when poor visibility, loss of daylight, a heavy workload, or other distracting conditions exist. By automatically adjusting the speed or braking of the first aircraft, the workload and/or stress level of the pilot may be reduced, and a safe distance may be maintained between the first and second aircraft. In addition, when a first aircraft is directed to follow the path of a second aircraft, a system to automatically guide the first aircraft along the second aircraft's path may decrease the workload and/or stress level of the pilot.

Figure 1:
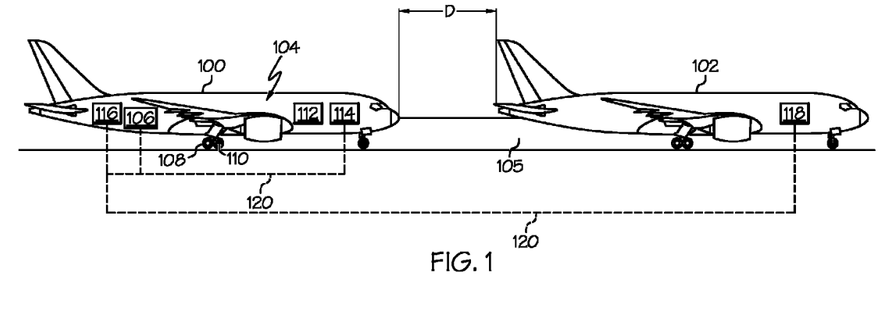
FIG. 1 is a pictorial schematic of a first aircraft maintaining a distance from a second aircraft according to an exemplary embodiment of the present invention.

Referring now to FIG. 1, a pictorial schematic of a first aircraft 100 maintaining a safe distance "D" from a second aircraft 102, according to an exemplary embodiment, is illustrated. The first aircraft 100 may be following the second aircraft 102 on a taxiway 105. The first aircraft 100 may include a motive control system 104 which automatically maintains a safe distance "D" between the first aircraft 100 and the second aircraft 102.

The motive control system 104 may include an electric taxi system (ETS) 106 which may provide motive power to the first aircraft 100 while the first aircraft 100 is taxiing. The ETS 106 may selectively drive one or more wheels 108 on one or more landing gear assemblies. The motive control system 104 may also include an electronic controller 112, a first aircraft position determination system 114, and a receiver 116. The ETS 106, position determination system 114, and receiver 116 may be communicatively connected to the controller 112 through communication links 120. Communication links 120 are depicted in FIG. 1 with dashed lines. For the purpose of this application, communication links may include any communicative link through which information is transferred from one electronic device to another electronic device. The communication link 120 may include a hardwire data link, such as an electrical cable or optic cable. The communication link 120 may also, or alternatively, include a link between a transmitter and receiver through which information is transmitted, such as a radio frequency wave carrying a data signal. The information may be transmitted in a variety of ways including analogue and digital signals, using a variety of communication protocols.

The second aircraft 102 may include a transmitter 118 which may transmit information such as the second aircraft 102 position and second aircraft identification information. The transmitter 118 may be communicatively connected to the receiver 116 of the first aircraft 100.

Figure 2:
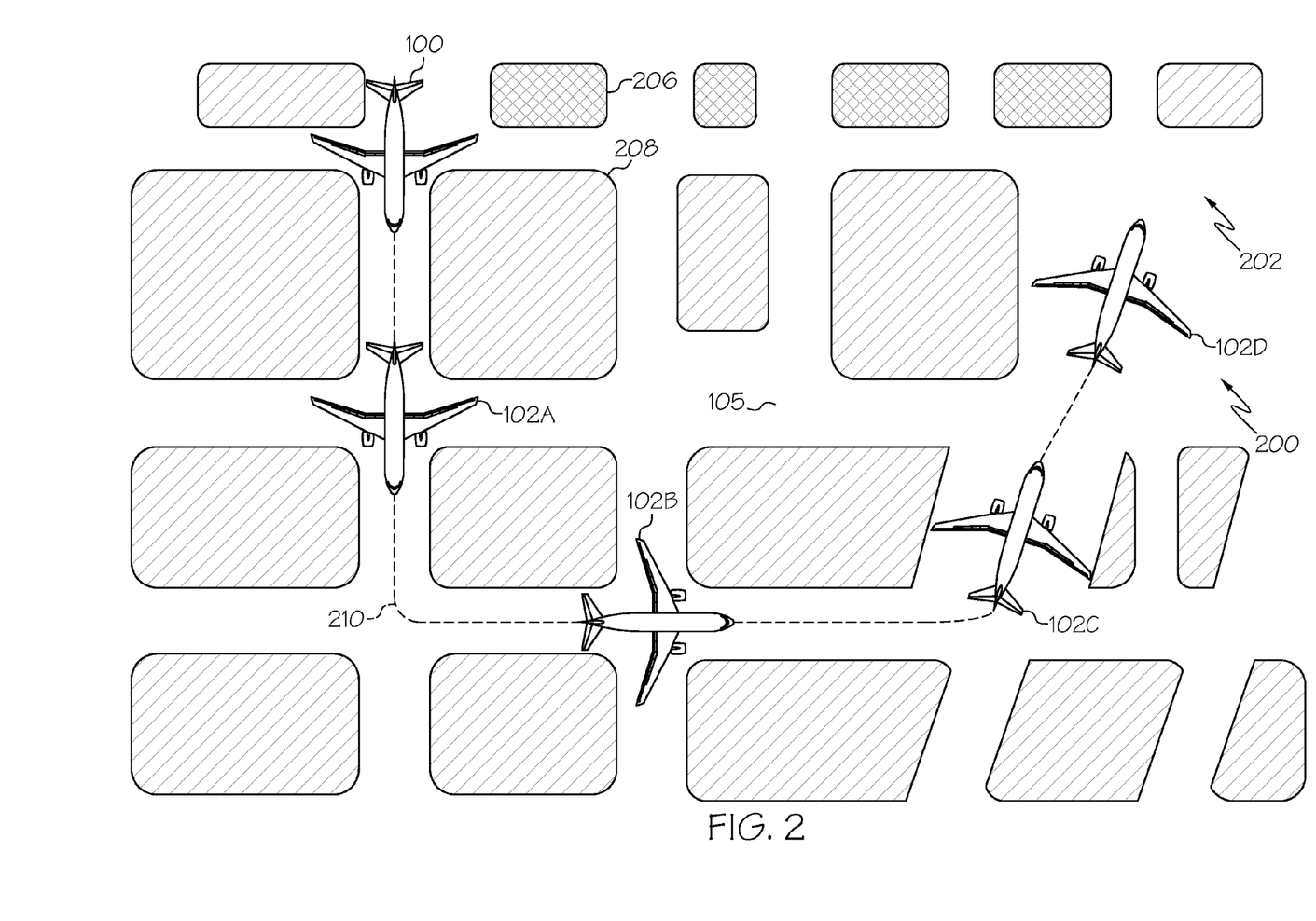
FIG. 2 is a pictorial schematic of a first aircraft following a path of a second aircraft according to an exemplary embodiment of the present invention.

Referring now to FIG. 2, a pictorial schematic of the first aircraft 100 following a second aircraft route 210 of the second aircraft 102, according to an exemplary embodiment, is illustrated. Elements in FIG. 2 which are similar to elements in FIG. 1, are numbered in a similar manner to those in FIG. 1. The schematic includes a map 200 of an airport 202. The airport 202 may include terminals, buildings or green space 208, and taxiways 105. First aircraft 100 may be directed to follow the second aircraft route 210 of the second aircraft 102. The second aircraft 102 may transmit, through transmitter 118, periodic second aircraft position signals. For example, second aircraft 102 may transmit second aircraft position signals from several positions depicted as the second aircraft 102A, 102B, 102C, and 102D. The first aircraft 100 may receive the second aircraft position signals through receiver 116 and the controller 112 may calculate the second aircraft route 210. The first aircraft 100 may then be automatically guided through motor command signals and tiller command signals along the second aircraft route 210.

Figure 3:
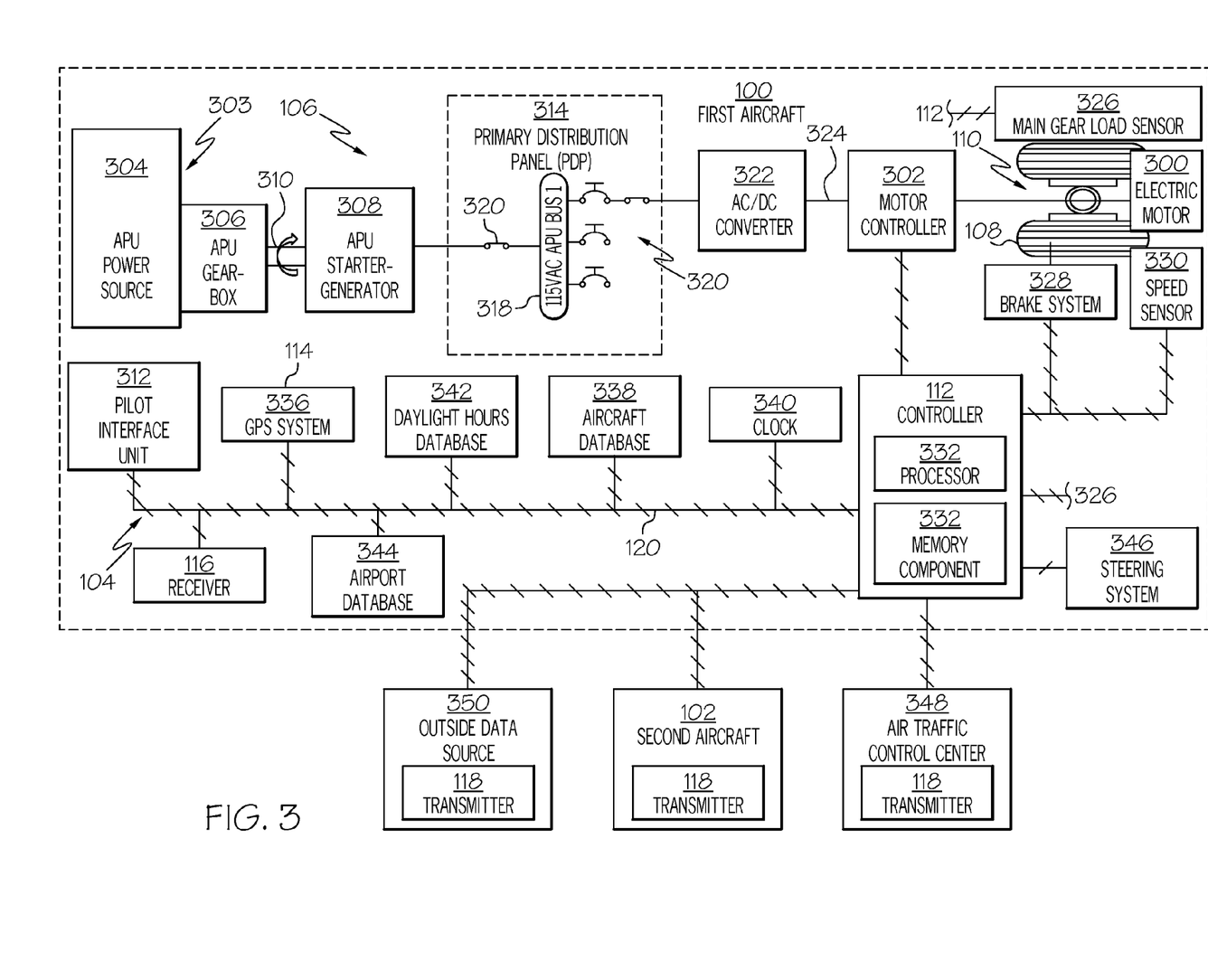
FIG. 3 is a schematic of an electric taxi motive control system of a first aircraft according to an exemplary embodiment of the present invention.

Referring now to FIG. 3, a schematic of an exemplary embodiment of the electric taxi motive control system 104 of the first aircraft 100 is illustrated. Elements in FIG. 3 which are similar to elements in FIGS. 1 and 2, are numbered in a similar manner to those in FIGS. 1 and 2. The system 104 may include at least one electric motor 300 selectively providing motive power to the first aircraft 100 during taxis in response to a first aircraft commanded speed signal or a modified first aircraft commanded speed signal; the first aircraft position determining system 114 configured to generate a first aircraft position signal indicative of a position of the first aircraft 100 at the airport 202; the first aircraft receiver 116, configured to receive transmission of a second aircraft position signal indicative of a position of a second aircraft 102 at the airport 202; a first aircraft pilot interface 312 configured to accept an input indicative of a first aircraft desired speed and generate a commanded speed signal indicative of the first aircraft desired speed; and the first aircraft electronic controller 112 configured to; determine a aircraft separation distance indicative of the distance between the first aircraft 100 and the second aircraft 102 at least in part based on the first aircraft position signal and the second aircraft position signal; compare the aircraft separation distance with a safe distance value; and generate a modified first aircraft commanded speed signal when the aircraft separation distance is less than the safe distance value, the modified first aircraft commanded speed signal less than the first aircraft commanded speed signal.

The system 104 may include the ETS 106, which may include an auxiliary power unit assembly (APU) 303, which may include an APU power source 304 drivingly connected to an APU starter-generator 308 through an APU gear-box 306, and a mechanical connection 310. The APU starter-generator 108 may be selectively electrically connected to and may selectively provide electric power to one or more motor controllers 302, to move the first aircraft 100 along the ground during taxi and landing operations. The APU 303 may also power other systems on the first aircraft 100 during flight and ground operations as would be known in the art.

Power from the APU starter generator 308 may flow through one or more primary distribution panels (PDPs) 314 to one or more AC/DC converters 322. The one or more PDPs 314 may include AC power bus 318. The AC power buses 118 may be about 115 Vac and may be selectively electrically connected to the APU starter generator 308 and the one or more AC/DC converters 322 through switches 320 and other electrical connectors 324. In general, electrical power connections in the schematic of FIG. 3 are represented by solid lines 324 without hatch marks.

The one or more motor controllers 322 may be electrically connected to and provide current to the one or more motors 300 in a manner that causes the one or more motors 300 to generate torque and operate at a speed based on the first aircraft speed command or the first aircraft modified speed command. Although the ETS 106 may include multiple motors 300 and associated motor controllers 302 and APU 303 connecting elements 314, 318, 320, 322, 324, which may drive multiple wheels 108 on more than one landing gear assembly 110, from here on, the ETS 106 will be described in relation to one a single motor 300, on a single wheel 108, on a single landing gear assembly 110. In one example, the motor controller 302 may include inverter assemblies (not shown) which provide current at a frequency and amplitude which will result in the desired torque and speed, or a modified torque and speed. The motor controller 302 may be communicatively connected through communication links 120 to the controller 112 to receive speed commands. In general, communication links 120 are represented by lines with hatch marks in FIG. 3.

The landing gear assembly 110 may include the wheel 108, a main gear load sensor 326, a speed sensor 330, and a brake system 328. The main gear load sensors 326 may be configured to generate a main gear load signal indicative of a weight load on the main gear of the landing assembly 110. Main gear load sensors 326 are known in the art, and may, for example, include a strain gauge. The main gear load sensors 326 may be communicatively connected to the controller 112. When each landing gear assembly 110 includes a main gear load sensor 326 configured to generate a main gear load signal, and communicatively connected to the controller 112, the controller 122 may be configured to determine a weight of the first aircraft 100 as a function of all of the main gear load signals.

The speed sensor 330 may be configured to generate a speed signal indicative of the rotational speed of the wheel 108. The speed sensor 330 may include any speed sensors known in the art. The speed sensor 330 may be communicatively connected to the controller 112. The controller 112 may determine the speed and/or a turn of the first aircraft 100 based at least in part on the speed signal, along with any additional speed signals from other wheels 108. The controller 112 may alternatively determine the speed of the first aircraft 100 through the position determination system 114.

The landing gear assembly 110 may include a brake system 328 which may slow or stop the rotation of the wheel 108 in response to first aircraft braking commands. The brake system 328 may be communicatively linked to the controller 112 to receive the first aircraft braking commands. The braking system 328 may include any braking system known in the art.

The system 104 may include a steering system 346 which may steer the first aircraft 100 in response to steering inputs entered into the pilot interface unit 312, and/or first aircraft steering commands from the controller 112. The steering system 346 may for example angle the wheel 108 and/or part or the whole of the nose gear landing gear assembly 110. The steering system 346 may include alternative steering systems known in the art. The steering system 346 may be communicatively connected to the controller 112.

The pilot interface unit 112 may be configured to allow an operator (pilot) to enter an input indicative of a first aircraft desired speed, a steering input, an input indicative of a weather condition, an input indicative of natural light available, automatic system override inputs, an instruction to follow the second aircraft route 210 (after receiving the instruction verbally from an air traffic controller), and/or other inputs to pilot the first aircraft. The pilot interface unit 112 may be communicatively connected to the controller 112.

The system 104 may include the position determination system 114 configured to determine the position of the first aircraft 100. Position determination systems 114 are known in the art, and may include, in non-limiting examples, a GPS system 336, an inertial navigation system (INS), attitude and heading reference system (AHRS), a smart map system, and/or a combination of any or all of the preceding. The position determination system 114 may be communicatively connected to the controller 112.

Figure 4A:
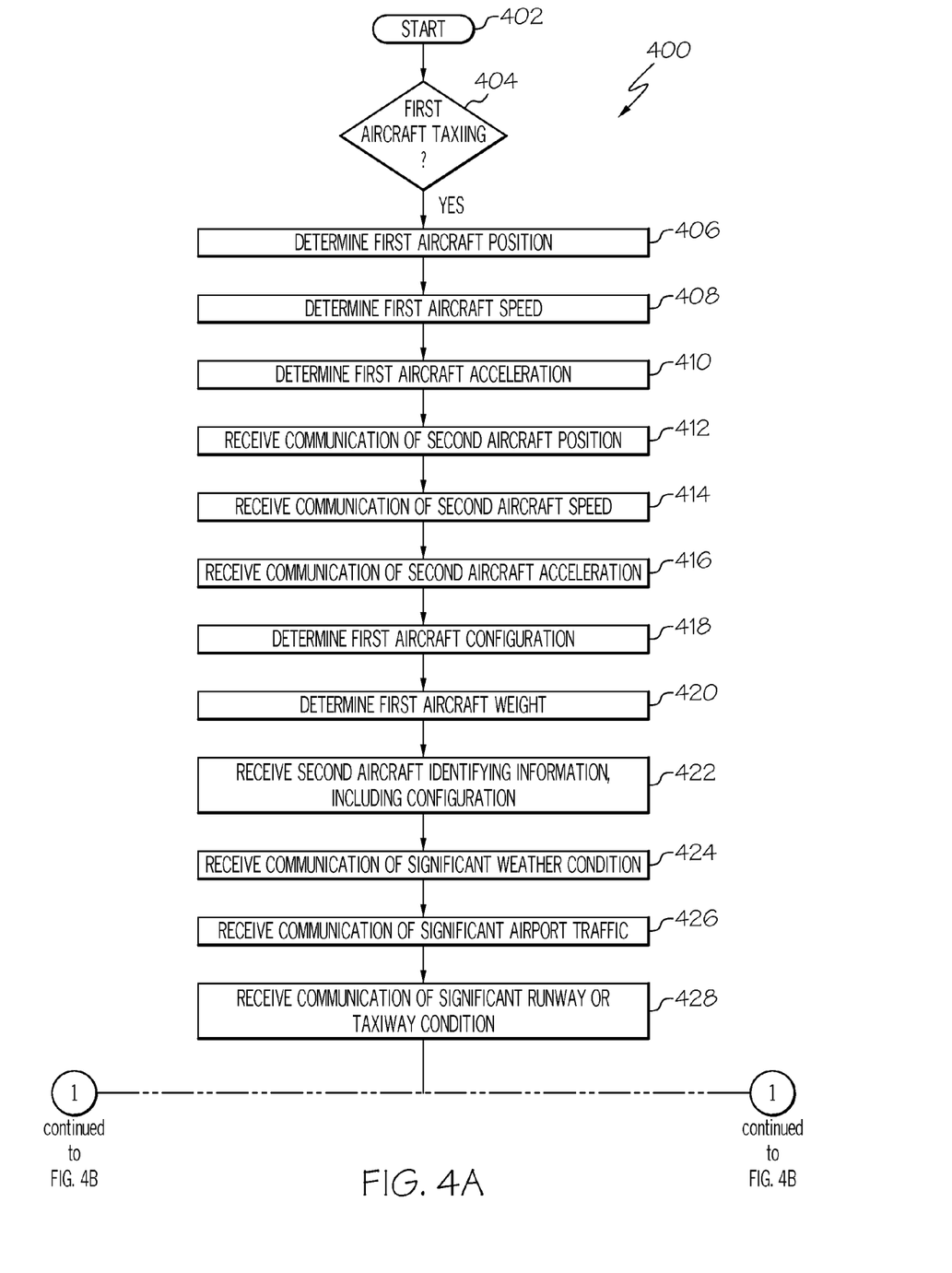
FIG. 4A is a flow chart of a first portion of an electric taxi motive control method of a first aircraft according to an exemplary embodiment of the present invention.
Figure 4B:
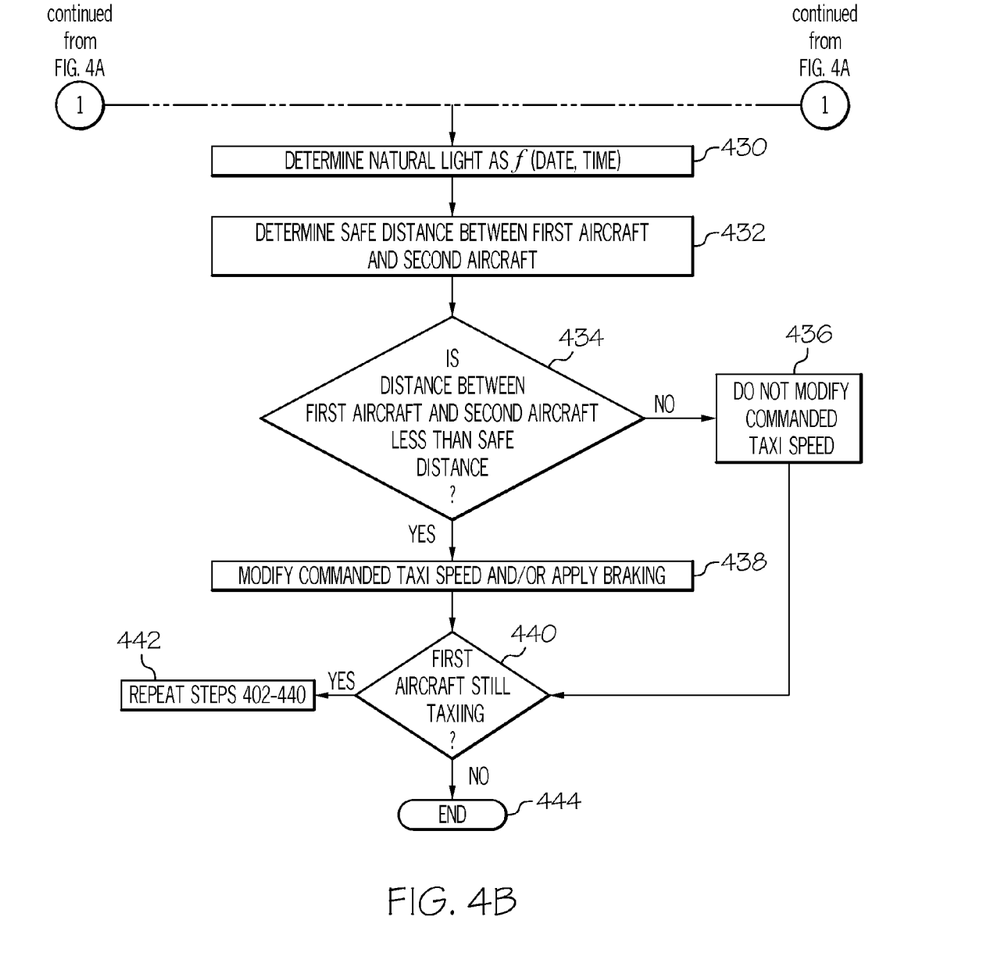
FIG. 4B is a flow chart of a second portion of an electric taxi motive control method of a first aircraft according to an exemplary embodiment of the present invention.
Figure 5:
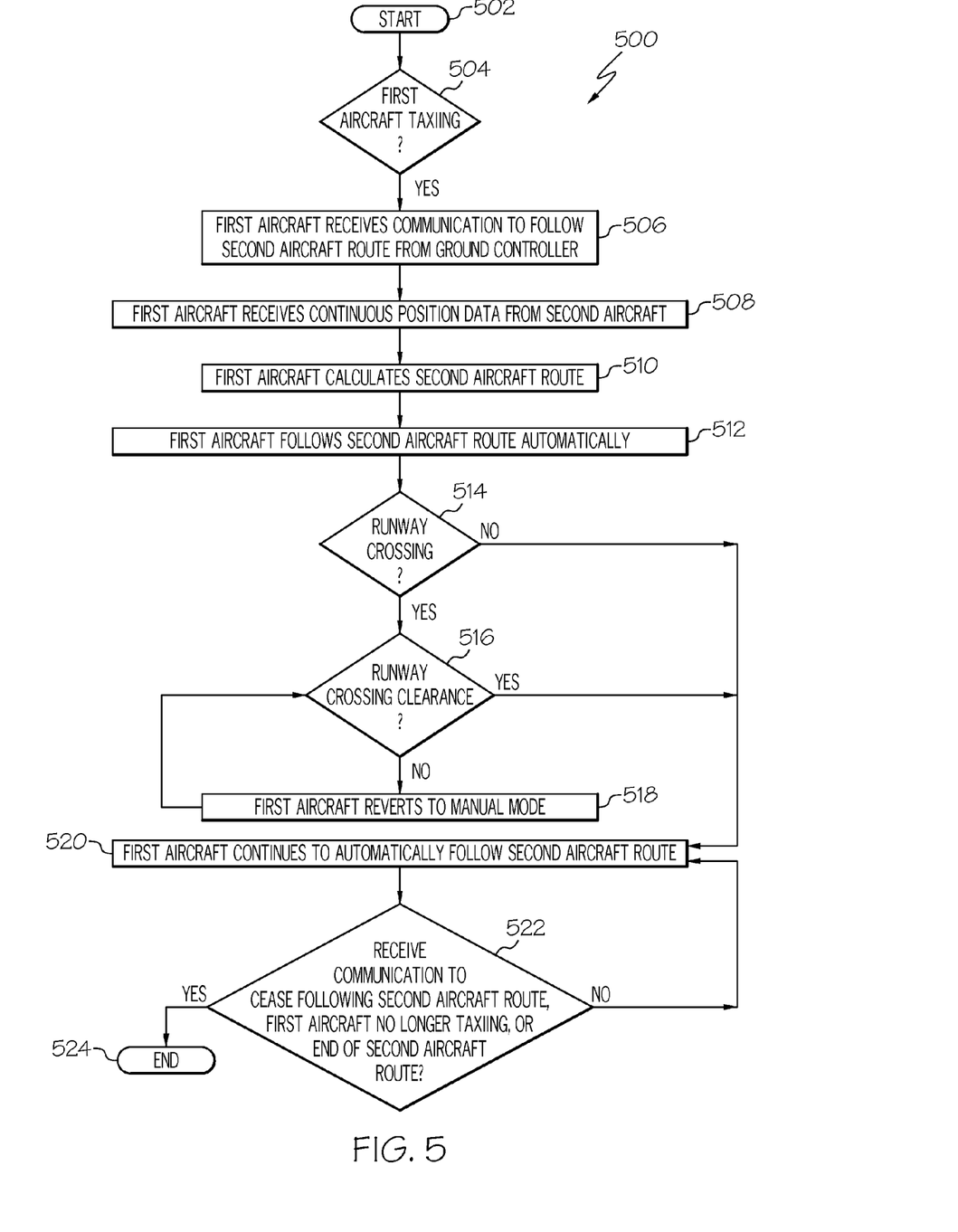
FIG. 5 is a flow chart of an electric taxi motive control method of a first aircraft according to an exemplary embodiment of the present invention.

The system 104 may include several data bases containing information and data the controller 112 may use in implementing instructions to perform methods such as the methods described in relation to FIGS. 4 and 5. These data bases may include, but are not limited to, an aircraft database 338, a daylight hours database 342, and an airport database 344. Although described as separate elements, these databases may all be part of one or more memory components which may be housed in one or more units. The actual memory locations in which data is stored, may or may not be consecutive, and may or may not be housed in the same unit. The term database may be used to refer to data in a particular category which is stored in one or more memory components and which may be communicatively connected to and available for use by the controller 112.

The aircraft database 338 may contain data about the models and configurations of multiple aircraft, including the second aircraft 102. The controller 112 may be able to identify the configuration of the second aircraft 102, through accessing the aircraft database with the identification information received from the second aircraft 102. The daylight hours database 342 may contain data on the hours of daylight at different locations on different dates. The controller 112 may be able to determine the light available outside the first aircraft through accessing the daylight hours database with a time, date, and first aircraft position. The airport database 344 may contain data on multiple airports where then first aircraft 100 operates and geographical information on the multiple airports. For example, the airport database may contain the location of taxiways, terminals, gates, and buildings at the airport.

The system 104 may include a clock 340 configured to generate a day and time signal indicative of the current date and time of day. The clock may be communicatively connected to the controller 112.

The controller 112 may include a processor 332 and a memory component 334. The processor 332 may include microprocessors or other processors as known in the art. In some embodiments the processor 332 may include multiple processors. The controller 112 may execute instructions, as described below and in relation to FIGS. 4 and 5 which may automatically maintain a safe distance "D" between the first aircraft 100 and the second aircraft 102; and/or may automatically guide the first aircraft 100 along a second aircraft route 210.

Such instructions may be read into or incorporated into a computer readable medium, such as the memory component 334, or provided external to processor 332. The instructions may include multiple lines or divisions of code. The lines or divisions of code may not be consecutive order, and may not be located in the same section of code. In alternative embodiments, hard-wired circuitry may be used in place of or in combination with software instructions as described above, below, or in relation to the drawings.

The term "computer-readable medium" as used herein refers to any non-transitory medium or combination of media that participates in providing instructions to the processor 332 for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics.

Although shown as one physical unit, the controller 112 may include multiple units, or be part of a larger controller unit, as is known in the art. The controller 112 may include one or more of the position determination system 336, the aircraft database 338, the clock 340, the daylight hours database 342, the airport database, and the receiver 116, as a part of one or more controller units.

The controller 112 may be communicatively connected with the second aircraft 102, an air traffic control center 348, and/or an outside data source 350, through transmitters 118 and the receiver 116. The outside data source 350 may include, for example, a source of weather conditions for different locations, or other information which might be used by the controller 112 to determine a safe distance between the first aircraft 100 and the second aircraft 102.

Referring now to FIG. 4A, a flow chart of a first portion of an exemplary electric taxi motive control method 400 of the first aircraft 100 is illustrated. The method 400 starts at 402. The controller 112 may determine whether the first aircraft 100 is taxiing (step 404). The controller 112 may base the determination of whether the first aircraft is taxiing, at least in part, on the position of the first aircraft 100 as determined by the position determination system 114, the speed signal, and/or other known methods of determining whether the first aircraft 100 is taxiing. If the first aircraft 100 is not taxiing, the controller 112 may wait a predetermined time period (not shown) and then repeat step 404. In alternative embodiments an event indicative of the first aircraft 100 taxiing may trigger the start of the method 400, in place of an ongoing loop, or an input to the pilot interface 312 indicative of the beginning of a taxi may be made. If the controller 112 determines that the first aircraft 100 is taxiing, the controller 112 may determine the first aircraft position through, for example, the position determination system 114 (step 406).

The controller 112 may determine a first aircraft speed, and a first aircraft acceleration based on periodic first aircraft position signals from the position determination system 114 (steps 408, 410). Alternatively the controller 112 may determine the first aircraft speed, and the first aircraft acceleration based on periodic speed signals or other means as known in the art.

The controller 112 may receive periodic second aircraft position signals indicative of the position of the second aircraft 102 through the receiver 116 (step 412). The signals may be transmitted from the transmitter 118 of the second aircraft 102 and received according to communication protocols of the automatic dependent surveillance-broadcast (ADS-B) system. The controller 112 may determine a second aircraft speed and a second aircraft acceleration as a function of the periodic second aircraft position signals as is known in the art, or may receive the second aircraft speed and the second aircraft acceleration through the receiver 116 after it is transmitted from the second aircraft 102 (steps 414, 416).

The controller 112 may determine the configuration of the first aircraft 100, and especially the configuration of the brake system 328 from, for example the aircraft database 338 (step 418). The controller 112 may determine the weight of the first aircraft 100, including the cargo and passengers carried by the first aircraft, based partly on, for example the main gear load signals, or any other method known in the art (step 420).

The controller 112 may receive from the second aircraft 102 a second aircraft configuration (step 422). The controller 112 may determine the second aircraft configuration through identification information transmitted from the second aircraft 102 and the aircraft database 338. The controller 112 may specifically determine a brake system configuration of the second aircraft.

The controller 112 may receive communication of a significant weather condition at the airport, for example snow, rain, or wet taxiways which might affect the magnitude of the safe distance "D" (step 424). The communication of a significant weather condition may come through the pilot interface 312 or through an outside data source 350. The controller 112 may receive a communication of significant traffic at the airport 202, or a significant runway or taxiway condition at the airport 202 from the air traffic control center 348 through receiver 116 (steps 426, 428). The method 400 continues to steps in FIG. 4B.

Referring now to FIG. 4B, a flow chart of a second portion of an exemplary electric taxi motive control method 400 of the first aircraft 100 is illustrated. The controller 112 may determine an amount of natural light available outside the first aircraft 100 at the airport 202, based at least in part on the date and time signals from the clock 340, the first aircraft position signal, and the daylight hours database; or alternatively through an input through the pilot interface 312 (step 430).

The controller 112 may determine a safe distance "D" between the first aircraft 100 and the second aircraft 102 (step 432). In one embodiment, the safe distance "D" may be a fixed value programmed into the memory component 334. For example, the safe distance "D" may be between forty (40) and sixty (60) meters. In other embodiments, the safe distance "D" may be determined, at least in part, based on one or more of the first aircraft speed, the first aircraft acceleration, the second aircraft speed, the second aircraft acceleration, the first aircraft brake configuration, the first aircraft weight, the second aircraft brake configuration, significant weather conditions, significant airport traffic, significant taxiway conditions, and natural light available.

For example, if the first aircraft speed or first aircraft acceleration is greater than the second aircraft speed and second aircraft acceleration respectively, the safe distance "D" may be a greater value. If, however, the first aircraft speed or first aircraft acceleration is less than the second aircraft speed and second aircraft acceleration respectively, the safe distance "D" may be a lesser value. In another example, the brake system 328 configuration and weight of the first aircraft 100 and the brake system configuration of the second aircraft 102 may determine how quickly each aircraft can come to a stop or slow down. If the first aircraft 100 can come to a stop and/or slow faster than the second aircraft 102, the safe distance "D" may be a lesser value. If, however, the second aircraft 102 can come to a stop and/or slow faster than the first aircraft 100, the safe distance "D" may be a greater value. In still other examples, significant weather conditions, significant airport traffic, a significant taxiway condition, and/or a lower amount of natural light may increase the safe distance "D".

The controller 112 may determine the actual distance between the first aircraft 100 and the second aircraft 102, for example based on the first aircraft position and the second aircraft position. The controller 112 may compare the actual distance between the first aircraft 100 and the second aircraft 102 and the safe distance "D" and determine if the actual distance is less than the safe distance "D" (step 434). If the actual distance is not less than the safe distance "D", the controller 112 may not modify the first aircraft commanded speed (step 436). If the actual distance is less than the safe distance "D", the controller may modify the first aircraft commanded speed to a modified first aircraft commanded speed, the modified first aircraft commanded speed less than the first aircraft commanded speed. The controller 112 may also generate braking commands such that the brake system 338 slows the first aircraft 100 (step 438).

The controller 112 may determine if the first aircraft 100 is still taxiing (step 440). If the first aircraft 100 is still taxiing, the controller 112 may repeat steps 402-440 (step 442). If the first aircraft 100 is no longer taxiing, the method 400 may end (step 444).

Referring now to FIG. 5, a flow chart of an exemplary electric taxi motive control method 500 of the first aircraft 100 is illustrated. The method 500 may include generating the first aircraft position signal indicative of a position of the first aircraft 100 at the airport 202; receiving periodic continuous transmissions of the second aircraft position signals indicative of positions of the second aircraft 102 at the airport 202; receiving a follow second aircraft route signal from the air traffic control center 348 at the airport 202, indicative of an air traffic control instruction to the first aircraft 100 to follow the second aircraft route 210; calculating the second aircraft route 210 based at least in part on the second aircraft position signals; and operating the first aircraft 100 in an automatic mode including generating motor control commands and steering commands to guide the first aircraft 100 along the second aircraft route 210, at least in part based on the first aircraft position signal.

The method 500 may start at 502. The controller 112 may determine if the first aircraft 100 is taxiing, based, for example, at least in part on the first aircraft position, and the speed signals; or through an input to the pilot interface 312 (step 504). Alternatively, other methods known in the art may be used by the controller 112. If the first aircraft 100 is not taxiing, the controller 112 may wait for a predetermined time period and then check again, or the method 500 may start in response to a trigger event indicating the first aircraft is taxiing. If the first aircraft 100 is taxiing, the controller 112 may receive instructions from the air traffic control center 348 at the airport 202 to follow the second aircraft route 210 of the second aircraft 102 (step 506). The instructions to follow the second aircraft route 210 of the second aircraft 102 may be electronic and may be automatically transmitted to the controller 112; or alternatively, the instructions may be verbal via a radio link, and the pilot or another person may make an input indicative of the instruction to follow the second aircraft route 210 into the pilot interface 312 and a corresponding signal may be transmitted to the controller 112.

The controller 112 may receive the periodic continuous second aircraft position signals with the receiver 116 from the transmitter 118 of the second aircraft 102 (step 508). The controller 112 may calculate the second aircraft route 210, based at least in part on the second aircraft position signals (step 510). The controller 112 may operate the first aircraft 102 in an automatic mode to guide the first aircraft 100 along the second aircraft route 210 (step 512). Automatically guiding the first aircraft 100 along the second aircraft route 210 may include automatically generating motor control commands to control the one or more motors, and automatically generating steering commands to the steering system 338. The controller 210 may use first aircraft position signals as a feedback to guide the first aircraft 100 along the second aircraft route 210.

The controller 112 may determine if the first aircraft 100 is within a predetermined distance from a runway crossing based at least in part on the first aircraft position signal and data from the airport database (step 514). If the first aircraft is not within the predetermined distance from a runway crossing, the controller 112 may continue to automatically guide the first aircraft along the second aircraft route 210 (step 520). If the first aircraft 100 is within the predetermined distance from a runway crossing, the controller 112 may check if a runway crossing clearance has been received from the air traffic control center 348 (step 516). The runway crossing clearance may be transmitted to the controller 112 as an electronic signal through the receiver 116; or may be a verbal signal from an air traffic controller via a radio link, and the pilot or another person may make an input into the pilot interface 312, and a corresponding signal may be transmitted to the controller 112. If a runway crossing clearance has been received from the air traffic control center 348, the controller 112 may continue to automatically guide the first aircraft 100 along the second aircraft route 210 (step 520). If runway crossing clearance has not been received, the controller 112 may revert to manual control of the first aircraft to allow stopping before reaching the runway (step 518). After stopping or slowing before the runway crossing, the controller 112 may continue to check for runway clearance (step 516), and when received may begin to again automatically guide the first aircraft 100 along the second aircraft route 210 (step 520).

If the controller 112 determines that a cease following the second aircraft route 210 communication has been received from the air traffic control center 348, the first aircraft 100 is no longer taxiing, and/or the second aircraft route 210 has ended (step 522), the method 500 may end (step 524); otherwise the controller continues to automatically guide the first aircraft 100 along the second aircraft route 210 (step 520).

Although many of the communication signals to the controller 112 are described in relation to an automatic system; in alternative embodiments these signals may be entered by the pilot or another person through the pilot interface 312.

It should be understood, of course, that the foregoing relates to exemplary embodiments of the invention and that modifications may be made without departing from the spirit and scope of the invention as set forth in the following claims.

We claim:

1. An electric taxi motive control system of a first aircraft, comprising:
   at least one electric motor selectively providing motive power to the first aircraft during taxiing in response to a first aircraft commanded speed signal or a modified first aircraft commanded speed signal;
   a first aircraft position determining system configured to generate a first aircraft position signal indicative of a position of the first aircraft at an airport;
   a first aircraft receiver, configured to receive transmission of a second aircraft position signal indicative of a position of a second aircraft at the airport;
   a first aircraft pilot interface configured to accept an input indicative of a first aircraft desired speed and generate the first aircraft commanded speed signal indicative of the first aircraft desired speed;
   a first aircraft electronic controller configured to:
      determine a aircraft separation distance indicative of the distance between the first aircraft and the second aircraft, at least in part based on the first aircraft position signal and the second aircraft position signal;
      compare the aircraft separation distance with a safe distance value;
      generate the modified first aircraft commanded speed signal when the aircraft separation distance is less than the safe distance value, the modified first aircraft commanded speed signal less than the first aircraft commanded speed signal;
   wherein the first aircraft receiver is further configured to receive transmission of airport traffic information signals from an air traffic control center; and
   wherein the first aircraft electronic controller is further configured to determine the safe distance value at least in part based on the airport traffic information signals.

2. The electric taxi motive control system of claim 1, wherein the safe distance value comprises a specific value programmed into a memory component of the first aircraft electronic controller.

3. The electric taxi motive control system of claim 1, wherein;
the first aircraft receiver is further configured to receive transmission of a second aircraft identification signal indicative of a second aircraft model; and
the first aircraft electronic controller is further configured to determine the safe distance value at least in part based on the second aircraft identification signal.

4. The electric taxi motive control system of claim 1, wherein;
the first aircraft pilot interface is further configured to accept an input indicative of a weather condition and generate a weather condition signal indicative of the weather condition; and
the first aircraft electronic controller is further configured to determine the safe distance value at least in part based on the weather condition signal.

5. The electric taxi motive control system of claim 1, wherein;
the first aircraft receiver is further configured to receive transmission of weather information signals from an outside data source; and
the first aircraft electronic controller is further configured to determine the safe distance value at least in part based on the weather information signals.

6. The electric taxi motive control system of claim 1, further comprising a clock configured to generate a time and date signal indicative of the current time of day and date; and
wherein the first aircraft electronic controller is further configured to determine the safe distance value at least in part based on the time and date signal.

7. The electric taxi motive control system of claim 1, further comprising an airport database including taxiway location information; and
the first aircraft receiver is further configured to receive transmission of taxiway information signals from an air traffic control center; and
wherein the first aircraft electronic controller is further configured to determine the safe distance value at least in part based on the first aircraft position signal, the taxiway location information, and the taxiway information signals.

8. The electric taxi motive control system of claim 1, further comprising main gear load sensor configured to produce a load signal indicative of the weight load on the main gear of a wheel of a landing gear of the first aircraft; and
wherein the first aircraft electronic controller is further configured to determine the safe distance value at least in part based on the load signals.

9. The electric taxi motive control system of claim 1, wherein;
the first aircraft pilot interface is further configured to accept an override input and generate an override signal in response to the override input; and
the first aircraft electronic controller is further configured to cease generating modified first aircraft commanded speed signals in response to the override signal.

10. An electric taxi motive control method of a first aircraft, comprising:
generating a first aircraft position signal with a GPS system on the first aircraft, the first aircraft position signal indicative of the position of the first aircraft at an airport;
receiving a second aircraft position signal indicative of a position of a second aircraft at the airport with a receiver on the first aircraft;
receiving a first aircraft desired speed with a first aircraft pilot interface;
generating a first aircraft commanded speed signal based at least in part on the first aircraft desired;
determining, with a first aircraft electronic controller, an aircraft separation distance indicative of the distance between the first aircraft and the second aircraft based at least in part on the first aircraft position signal and the second aircraft position signal;
comparing, with the first aircraft electronic controller, the aircraft separation distance with a safe distance value; and
generating, with the first aircraft electronic controller, a modified first aircraft commanded speed signal, when the aircraft separation distance is less than the safe distance value, the modified first aircraft commanded speed signal less than the first aircraft commanded speed signal;
generating an actual speed signal indicative of a speed of a wheel of a landing gear of the first aircraft with a speed sensor;
controlling a current supplied to an electric motor providing motive power to a wheel of a landing gear of the first aircraft based at least in part on the modified first aircraft commanded speed signal and the actual speed signal; and
controlling a brake system to provide braking of a wheel of a landing gear of the first aircraft based at least in part on the modified first aircraft commanded speed signal and the actual speed signal.

11. An electric taxi motive control system of a first aircraft, comprising:
at least one electric motor selectively providing motive power to the first aircraft during taxis in response to motor control commands;
a steering system configured to steer the first aircraft in response to steering commands;
a first aircraft position determining system configured to generate a first aircraft position signal indicative of a position of the first aircraft at an airport;
a first aircraft receiver, configured to receive periodic continuous transmission of second aircraft position signals indicative of positions of a second aircraft at the airport; and receive a follow second aircraft route signal from an air traffic control center at the airport, indicative of an air traffic control instruction to the first aircraft to follow a second aircraft route; and
a controller configured to, in response to receiving the follow second aircraft route signal;
calculate the second aircraft route based at least in part on the second aircraft position signals; and
operate the first aircraft in an automatic mode including generating motor control commands and steering commands to guide the first aircraft along the second aircraft route, at least in part based on the first aircraft position signal.

12. The electric taxi motive control system of claim 11, wherein the controller is further configured to:
determine that the first aircraft is within a fixed distance of a runway while the first aircraft is being guided along the second route, based at least in part on the first aircraft position signal and information from an airport database; and
determine if a runway crossing clearance signal has been received by the first aircraft receiver from the air traffic control center; and cease operating the first aircraft in an automatic mode and revert to operating the first aircraft in a manual mode, if a runway crossing clearance signal has not been received.

13. The electric taxi motive control system of claim 11, wherein the controller is further configured to;
   determine that the first aircraft is within a fixed distance of a runway while the first aircraft is being guided along the second route, based at least in part on the first aircraft position signal and information from an airport database; and
   determine if a runway crossing clearance signal has been received by the first aircraft receiver from the air traffic control center; and
   continue operating the first aircraft in an automatic mode, if a runway crossing clearance signal has been received.

14. The electric taxi motive control system of claim 11, wherein the at least one electric motor is selectively electrically connected to an auxiliary power unit through a motor controller.

15. The electric taxi motive control system of claim 11, wherein a motor controller selectively provides electric power at a voltage amplitude, a current amplitude, and a frequency; the voltage amplitude, the current amplitude, and the frequency based at least in part on the motor control commands.

\* \* \* \* \*